2,874,143
POLYTRIFLUORCHLOROETHYLENE STABILIZED WITH TETRAPHENYL TIN

William S. Barnhart, Cranford, and Robert H. Wade, Ridgeview Drive, N. J., assignors, by mesne assignments, to Minnesota Mining and Manufacturing Company, St. Paul, Minn., a corporation of Delaware No Drawing. Application May 26, 1954
Serial No. 432,588

1 Claim. (Cl. 260—45.75)

This invention relates to the treatment of perfluorochloroolefin polymers. In one of its aspects the invention relates to the stabilization of perfluorochloroolefin polymers in the oil, grease and wax range and the normally solid thermoplastic polymers. In another aspect, the invention relates to a method of improving the heat-aging characteristics of trifluorochloroethylene polymers.

Polymers of the perfluorochloroolefins, such as trifluorochloroethylene are characterized by wholly different chemical and physical characteristics than otherwise similar, but non-fluorinated polymeric materials. The chemical resistance of the perfluorochloroolefins is such that they will withstand exposure to a wide variety of oxidizing and reducing agents, such as fuming nitric acid, concentrated sulfuric acid, hydrazine, hydrogen peroxide, etc. Physically, the material possesses high thermal stability, excellent electrical properties and additionally in the case of the thermoplastic polymers, high tensile strength. Because of their properties, polymers of the perfluorochloroolefins in the oil, grease and wax range are widely used as transformer oils, lubricating oils, and dielectric oils in corrosive atmospheres or generally where other materials are not suitable. The thermoplastic polymers are readily molded into various articles such as valves, gaskets, etc. which may also be used under extremely adverse conditions.

Despite their extraordinary stability at high temperatures, polymers of the perfluorochloroolefins are none the less subject to thermal degradation particularly when they are maintained at elevated temperatures for prolonged periods of time. Under adverse conditions of temperature, the polymer degrades. This degradation is in reality a thermal cracking of the polymer chain with a consequent reduction in the molecular weight of the polymer and is evidenced by a reduction in the viscosity of polymers in the oil and grease range and by a reduction in N. S. T. (no strength temperature, a measure of molecular weight) of the thermoplastic polymer. Thus, when a thermoplastic polymer of trifluorochloroethylene having an N. S. T. of 332° C. is maintained at a temperature of about 325° C. for one hour, the N. S. T. is reduced to 235° C. Slight degradation may also occur, in the case of the thermoplastic polymer, during the molding operation particularly when the polymer is maintained at high temperatures for excessive periods of time. Degradation frequently renders the polymer useless in the application for which it was intended.

It is an object of this invention, to provide a process for improving the thermal stability of polymers of trifluorochloroethylene.

It is another object of this invention, to provide a means for stabilizing polymers of trifluorochloroethylene.

It is one of the more particular objects of this invention, to improve the thermal stability of trifluorochloroethylene polymers.

It is an object of this invention, to provide stabilizing agents for the perfluorochloroolefin polymers.

Various other objects and advantages will become apparent to those skilled in the art on reading the accompanying description and disclosure.

Generally, the above objects are accomplished by admixing with the polymer that is to be stabilized a quantity of a stabilizing agent selected from the group consisting of the aryl and alkyl derivatives of lead and tin.

The stabilizers of this invention are organo-metallic tetra-valent lead and tin compounds which contain aryl and alkyl substituents. The term alkyl includes those substituents which contain at least three carbon atoms, such as propyl, isopropyl, butyl, amyl, hexyl, and octyl radicals. The term aryl includes such as phenyl, tolyl, and xylyl radicals. The preferred group of stabilizers are those which contain at least one phenyl substituent. A particularly suitable stabilizer is tetraphenyl tin. It should be noted that not all tetra derivatives of lead and tin function as stabilizing agents for the perfluorochloroolefin polymers. Some tetra derivatives of lead and tin exhibit no stabilizing action on the polymer, while others tend to cause degradation. Among those tetra derivatives which do not function as stabilizing agents are compounds, such as tetramethyl tin, tetraethyl tin, lead tetra-acetate, tin tetra-acetate, etc. As indicated previously, phenyl substituted derivatives are preferred due to their greater stabilization efficiency. Within this preferred group are compounds, such as phenyl tributyl tin, diphenyl diamyl tin, triphenylbutyl tin, diphenyl dibutyl lead, and the preferred stabilizer tetraphenyl tin. The preferred class of alkyl derivatives includes such compounds as tetrapropyl tin, tetrabutyl tin, tetraoctyl tin, and tetrabutyl lead. The thermal stability of the perfluorochloroolefin polymers is markedly improved by addition of at least one of the above enumerated compounds.

Stabilization of the polymer is effected by admixing with the polymer between about 0.01 and about 10 percent, preferably between about 0.1 and about 5 percent of at least one of the stabilizing agents described above. The exact concentration of the stabilizing agent in the polymer is determined by the type of polymer being stabilized i. e. oil, grease, thermoplastic, etc. and by the use for which the polymer is intended. Thus, with oils and greases a lower concentration of stabilizer, usually between about 0.1 and about 1 percent by weight is used whereas when waxes and thermoplastics are stabilized between about 1 and about 2 percent by weight is employed. Again, when the use for which the polymer is intended indicates that extremely high temperatures may be encountered, higher concentrations of stabilizer are employed, for example between about 2 and about 5 percent by weight.

The perfluorochloroolefin polymers which are suited to the process of this invention, are derived by polymerization of monomers, such as trifluorochloroethylene, difluorodichloroethylene, fluorotrichloroethylene, etc. The polymer can be a low molecular weight or a high molecular weight polymer. For example, polymers of trifluorochloroethylene which can be stabilized are the oils which have a boiling range between about 95° C. and about 250° C. at 0.5 mm., waxes having a melting point between about 75° C. and about 125° C. and thermoplastic polymers having an N. S. T. above about 220° C., preferably above 300° C.

This invention also contemplates the treatment of copolymers of the perfluorochloroolefins, such as trifluorochloroethylene containing below about 5 mol percent of fluorine containing olefins, such as perfluorobutadiene, vinylidene fluoride, difluoroethylene, perfluorostyrene, perfluorocyclobutene, etc. It is also within the scope of this invention to stabilize mixtures of the various perfluorochloroolefins. For example, thermoplastic trifluoroethylene polymers, are usually plasticized with a lower molecular weight polymer of trifluorochloroethylene in the oil to wax range. These plasticized polymers are also stabilized as described herein.

Admixing of the stabilizing agent with the polymer may be effected in a variety of ways although usually the conventional mechanical techniques are preferred. The method to be employed in effecting the admixture is based on the physical characteristics of the polymer and of the stabilizing agent. Thus, if a thermoplastic polymer is to be stabilized and both the polymer and stabilizing agent are in finely-divided form, or if the stabilizing agent is a liquid, conventional tumbling type mixers, such as a barrel mixer, conical mixer and mushroom mixer may be employed. If either the thermoplastic polymer or the solid stabilizing agent are not already finely-divided, then they must be ground in order to secure thorough admixture. Although, the grinding of the stabilizing agent and of the polymer may be effected separately, it is preferred that they be ground together since the presence of the stabilizing agent will also retard thermal degradation which is apt to result during the grinding operation. Grinding of the polymer and stabilizing agent may also be effected in conventional equipment, such as ball and pebble mills, colloid mills and hammer mills. If the polymer is in the oil, grease or wax range, than conventional paint or ink blending equipment may be employed, such as a ribbon mill and three roll paint mill, etc.

In order to more fully illustrate the process of this invention, the following examples are presented. These examples illustrate the stabilization of trifluorochloroethylene oils, greases and thermoplastics. The amount of stabilizing agent employed is given in parts by weight based on the polymer. (All concentrations given herein are by weight and are based on polymer.) These data which are presented below are offered for purposes of illustration and are not to be construed as unnecessarily limiting the invention.

*Example I*

Effect of the stabilizing agent of this invention on a homopolymer of trifluorochloroethylene in the oil range (boiling range between 95° C. and 250° C. at 0.5 mm.) was determined by partially immersing a strip of #42 ashless filter paper in the oil which was maintained at 150° C. for 2½ hours. The paper was then examined for loss in strength and change in color. Results are tabulated below.

| Additive | Percent additive | Discolorize [1] | Tenderize |
|---|---|---|---|
| Tetraphenyl tin | 1.0 | 0 | No. |
| Do | 0.175 | 0 | No. |
| None | | 2 | Yes. |

[1] Arbitrary rating: 0=no detectable change; 2=standard rating without stabilizer.

*Example II*

This example illustrates the stabilization of a homopolymer of trifluorochloroethylene film prepared from a dispersion. Approximately 20 weight percent of the thermoplastic polymer in finely-divided form was admixed with a volatile thinner. The volatile thinner was a mixture containing 82 percent xylene and 18 percent di-isobutyl ketone. Solid tetraphenyl tin was added in the amount given in the table which amount is weight percent based on total solids. The dispersion was applied to a carbon steel test panel surface in two coats. The first coat was baked for ½ hour and the second coat was baked for 16 hours. Baking temperature was 275° C. The N. S. T. after fusion is based on a solution viscosity measurement calculated to N. S. T. on the basis of an empirical relationship. Results are tabulated below:

| Tetraphenyl tin | N. S. T. before fusion | N. S. T. after fusion | N. S. T. degradation |
|---|---|---|---|
| 0 | 308 | 220 | 88 |
| 0.33 | 308 | 241 | 67 |
| 0.5 | 308 | 272 | 36 |
| 1.0 | 308 | 272 | 36 |
| 2.0 | 308 | 277 | 31 |
| 4.0 | 308 | 273 | 35 |

*Example III*

This example illustrates the stabilization of a plasticized film of a homopolymer of trifluorochloroethylene prepared from a dispersion. This example corresponds to Example II except that plasticized trifluorochloroethylene homopolymer (25 weight percent) was added to the volatile thinner. The thermoplastic homopolymer (N. S. T. 270° C.) contained 25 weight percent of a liquid homopolymer of trifluorochloroethylene (boiling range 130° C. to 250° C. at 0.5 mm.) prepared by telomerizing with sulfuryl chloride. Two coats were applied as in Example II. Fusion temperature was 250° C.

| Tetraphenyl tin | N. S. T. before fusion | N. S. T. after fusion | N. S. T. degradation |
|---|---|---|---|
| 0 | 308 | 235 | 73 |
| 0.5 | 308 | 263 | 45 |
| 1.0 | 308 | 268 | 40 |
| 2.0 | 308 | 270 | 38 |
| 4.0 | 308 | 266 | 42 |

*Example IV*

The formula and procedures of Example III was repeated at a fusion temperature of about 275° C. Results are tabulated in Table IV.

| Tetraphenyl tin | N. S. T. before fusion | N. S. T. after fusion | N. S. T. degradation |
|---|---|---|---|
| 0 | 311 | 255 | 56 |
| 0.05 | 311 | 270 | 41 |

*Example V*

A homopolymer of trifluorochloroethylene (N.S.T. about 270° C.) was admixed with an olive drab pigment having the following approximate composition:

| | Percent |
|---|---|
| Cadmium oxide | 40 |
| Chromium oxide | 33 |
| Copper oxide | 17 |
| Zinc oxide | 6 |
| Iron oxide | 4 |

This pigment composition was selected because it has the least color stability of the colored pigments. (Most colored pigments change in intensity e. g. dark red becomes light red. The above composition changes from olive drab to grey.) Additionally, the above composition was selected because it contains copper and iron oxide which promote degradation of polytrifluorochloroethylene. The concentration of the pigment and of the stabilizer are given below in the table. Admixture was effected by blending as described herein (Mikropulvarize). The resulting admixture was pressed into a plaque by compression molding. Results are tabulated below where parts are by weight:

| Run | Polymer, parts | Pigment, parts | Stabilizer, parts | Result |
|---|---|---|---|---|
| 1 | 50 | 0.25 | 0.0 | Off color 15 mins. |
| 2 | 50 | 0.25 | 0.25 (tetraphenyl tin) | Color stable 45 mins. |
| 3 | 50 | 0.25 | 0.25 tin polysulfide (Thermolite). | Off color 15 mins. |
| 4 | 50 | 0.25 | 0.25 (tetraphenyl tin) | Color stable. |

The above runs were made at 300° C. Runs 1 to 3 were made in an oven and time noted. Run 4 was made in a press. The plaque was examined after 1½ hours exposure.

From the above tables of data it is apparent that the tetra-valent organic derivatives of lead and tin described herein markedly retard degradation of perfluorochloroolefin polymers, such as polytrifluorochloroethylene. The improved thermal stability which results from the incorporation of the stabilizers of this invention, is further evidenced by the behavior of pigmented perfluorochloroethylene polymer composition. In many of the applications for which the perfluorochloroolefins are used, it is desired that they be colored. Coloring or pigmenting, usually of the thermoplastic material, is accomplished by blending or mixing into the polymer a quantity of a colored inorganic compound. Among the compounds which are used to pigment polytrifluorochloroethylene, are the oxides of iron, chromium, zinc, cadmium, selenium, cobalt, and tin. Used either singly or in admixture with other pigments, a wide variety of colors may be imparted to the solid polymer. However, in some instances the color of the incorporated pigment changes during use. This change is believed due to the liberation of reactive materials when the polymer decomposes and is particularly noticeable when iron and selenium pigments are employed. The addition of tetraphenyl tin to these pigmented compositions improves the color stability of the pigment as is shown in Example V. The use of the tetravalent organic lead and tin compounds in conjunction with the stabilization of colored or pigmented polymer composition is therefore within the scope of this invention.

Various alterations and modifications of the invention and its aspects may become apparent to those skilled in the art without departing from the scope of this invention.

Having thus described our invention, we claim:

A novel polymer composition stabilized against thermal degradation which comprises an admixture of a homopolymer of trifluorochloroethylene and between about 0.01 and about 10 percent by weight of tetraphenyl tin.

References Cited in the file of this patent

UNITED STATES PATENTS

| | | |
|---|---|---|
| 2,445,739 | Rowland et al. | July 20, 1948 |
| 2,476,422 | Leininger | July 19, 1949 |
| 2,631,990 | Mack et al. | Mar. 17, 1953 |
| 2,643,242 | Churchill | June 23, 1953 |
| 2,676,940 | Kenyon | Apr. 27, 1954 |

OTHER REFERENCES

The Industrial Chemist, February 1949, pages 112–116.